United States Patent
Bednar (10) Patent No.: US 6,859,734 B2
(45) Date of Patent: Feb. 22, 2005

(54) METHOD AND SYSTEM FOR LIMITED FREQUENCY SEISMIC IMAGING

(75) Inventor: J. Bee Bednar, Houston, TX (US)

(73) Assignee: Paradigm Geophysical Corporation, Houston, TX (US)

( * ) Notice: Subject to any disclaimer, the term of this patent is extended or adjusted under 35 U.S.C. 154(b) by 0 days.

(21) Appl. No.: 10/679,923

(22) Filed: Oct. 6, 2003

(65) Prior Publication Data

US 2004/0111217 A1 Jun. 10, 2004

Related U.S. Application Data

(60) Provisional application No. 60/416,140, filed on Oct. 4, 2002.

(51) Int. Cl.[7] .............................................. G01V 1/28
(52) U.S. Cl. ...................................................... 702/14
(58) Field of Search ............................. 702/14, 16, 17, 702/18

(56) References Cited

U.S. PATENT DOCUMENTS

| | | | |
|---|---|---|---|
| 5,734,829 A | 3/1998 | Robinson | 395/200.35 |
| 5,995,904 A | 11/1999 | Willen et al. | 702/14 |

OTHER PUBLICATIONS

L. Sirgue et al.; *Frequency Domain Waveform Inversion: A strategy for choosing frequencies*, EAGE 63rd Conference & Technical Exhibition—Amsterdam, The Netherlands, Jun. 11–15, 2001, pp. 1–4, 5 Figs.

L. Sirgue etal.; *An optimal choice of temporal frequencies for imaging: application to waveform inversion*, 71st Ann. Internat. Mtg.: Soc. of Expl. Geophys., pp. 698–701, 7 Figs.

R.–E. Plessix et al., *Frequency–domain finite–difference migration with only few frequencies?*, 71st Ann. Internat. Mtg.: Soc. of Expl. Geophys., pp. 1103–1106, 9 Figs.

Robert W. Clayton et al.; *A Born–WKBJ inversion method for acoustic reflection data*, Geophysics, vol. 46, No. 11 (Nov. 1981) pp. 1559–1567, 3 Figs.

*Primary Examiner*—Donald McElheny, Jr.
(74) *Attorney, Agent, or Firm*—Madan, Mossman & Sriram, P.C.

(57) ABSTRACT

The method and system of the present inventions provides a new approach for selecting frequencies comprising a minimal or limited frequency data set for imaging leading to an order of magnitude decrease in computation resources. Seismic data are acquired and transformed a frequency domain. The data may be gathered in any manner. A plurality of minimal frequency subsets are formed comprising selected frequencies. The frequencies may be selected so that more frequencies are selected for shallower image positions. The selected frequencies are imaged to form frequency images. The selected frequencies may be individually weighted to assure a full and balanced bandwidth. The frequency images are composited to form an intermediate or final composited migration image.

16 Claims, 9 Drawing Sheets

METHOD AND SYSTEM FOR LIMITED FREQUENCY SEISMIC IMAGING

CROSS REFERENCE TO RELATED APPLICATIONS

This application claims priority from U.S. Provisional App. Ser. No. 60/416,140 filed on Oct. 4, 2002.

FIELD OF THE INVENTION

This invention relates to the field of seismic data processing and, more particularly, to the use migration for determining subsurface earth structure represented by a 3-D volume of data for identifying structural and stratigraphic features in three dimensions.

BACKGROUND OF THE INVENTION

Searching for subsurface mineral and hydrocarbon deposits comprises data acquisition, analysis, and interpretation procedures. Data acquisition involves energy sources generating signals propagating into the earth and reflecting from subsurface geologic structures. The signals received are recorded by receivers on or near the surface of the earth. The received signals are stored as time series (seismic traces) that consist of amplitudes of acoustic energy which vary as a function of time, receiver position, and source position and, most importantly, vary as a function of the physical properties of the structures from which the signals reflect. The data are generally processed to create volumes of acoustic images from which data analysts (interpreters) create maps and images of the subsurface of the earth.

Data processing involves procedures that vary depending on the nature of the data acquired and the geological structure being investigated. A typical seismic data processing effort produces images of geologic structure. The final product of data processing sequence depends on the accuracy of these analysis procedures.

Processed seismic data are interpreted to make maps of subsurface geologic structure to aid decisions for subsurface mineral exploration. The interpreter's task is to assess the likelihood that subsurface hydrocarbon deposits are present. The assessment will lead to an understanding of the regional subsurface geology, important main structural features, faults, synclines and anticlines. Maps and models of the subsurface, both in 2D and 3D representations are developed from the seismic data interpretations. As is well known in the art, the quality and accuracy of the seismic data processing has a significant impact on the accuracy and usefulness of the interpreted data.

High quality data processing greatly simplifies data interpretation, since resources can be focused on the geologic structure since subsurface imaging can be made less ambiguous. Unfortunately, three dimensional geophysical data processing and/or modeling frequently require large computation expenses, and practitioners are forced to simplify the data processing effort as much as possible to reduce analysis time and cost.

The sheer volume of data impacts data processing considerations. Seismic survey data sets can involve hundreds of thousands of source locations, with each source location associated with many hundreds more receiver locations. Each input/output data transfer demand burdens resources independent of the computation burden.

There have been several different approaches to manage these computational resource burdens. These approaches relate to the manner in which the data acquisition exercise is designed and carried out, as well as to assumptions made during data processing. The use of available a priori geologic and geophysical information can facilitate the minimization of the seismic data acquisition effort. Such a minimization of resources reduces the amount of data that is acquired by reducing the acquisition effort.

Minimization of the computational effort is often implemented during data processing. Compromises often required during data acquisition and processing can result in ambiguous and/or inaccurate subsurface images. Because little is generally known of the geologic structure being investigated, the interpreter will not know the extent the images are erroneous.

It is not uncommon for significant computer resources to be involved when large or complex data volumes are processed, often involving weeks or months of actual computer processing time. The recent availability of massively parallel processor computers offers a significant opportunity to reduce overall processing times. Massively parallel processors (MPPs) can have multiple central processing units (CPUs) which can perform simultaneous computations. By efficient use of these CPUs, projects that took weeks or months of resource time previously can be reduced to a few days or a few hours. These advantages can be enhanced further when efficient algorithms are included in the MPP software.

Computational algorithms have previously been written for prior seismic analysis routines using single or just a few processors, usually using sequential computing. Sequential computing performs single procedures at any given time. Options for obtaining enhanced performance are limited when few processors are available.

MPP computing machines offer an obvious computation advantages. The total time required to process a dataset can be reduced by dividing the work to be done among the various CPUs or CPU clusters in manner such that each CPU performs useful work while other CPUs also work in parallel.

Seismic data consists generally of a large number of individual traces, each recorded somewhat independently of the other traces. Logically enough, sequential computing methods that require the processing focus to be placed on a single calculation at a time adapt well to analysis of these independent traces using parallel processing. This is true even though computational bottlenecks may exist. For example, portions of the processing sequence may require relatively more computation time than other portions, must be completed before other calculations may proceed, or may rely on input data other than seismic data, for example traveltimes. Even though parallel processing significantly decreases total processing times, efficient processing algorithms can also contribute significant time reductions.

For large datasets frequency domain methods offer significant computation cost savings. An option for overcoming increased computational loads is to employ efficient frequency domain migration algorithms.

It would therefore be desirable to have a system and method that is able to provide a migration in the frequency-wavenumber domain on parallel computer in a cost-effective manner. The present invention satisfies this need.

SUMMARY OF THE INVENTION

The method and system of the present inventions provides a new approach for selecting frequencies comprising a minimal or limited frequency data set for imaging leading to an order of magnitude decrease in computation resources. Seismic data are acquired and transformed a frequency domain. The data may be gathered in any manner. A plurality of minimal frequency subsets are formed comprising selected frequencies. The frequencies may be selected so that more frequencies are selected for shallower image positions. The selected frequencies are imaged to form frequency images. The selected frequencies may be individually weighted assure a full and balanced bandwidth. The frequency images are composited to form an intermediate or final composited migration image.

BRIEF DESCRIPTION OF THE DRAWINGS

The present invention and its advantages will be better understood by referring to the following detailed description and the attached drawings in which.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

Zero-offset-migration/inversion of single frequency data produces a subsurface image with spatial wavenumbers confined to an Ewald sphere defined by a simple dispersion relation. For non-zero-offset, the Ewald sphere becomes an Ewald doughnut. A single frequency images a wavenumber volume rather than just a spherical shell. This fact can be exploited to substantially reduce the number of frequencies needed to accurately map subsurface reflectors. This invention provides a method and apparatus for calculating a sparse set of frequencies for use in frequency-slice migration algorithms. The migration process remains the same, but the smaller set of frequencies results in an algorithm an order of magnitude faster than more traditional implementations. A small collection of case studies compares the limited frequency approach to traditional methods. Finally, we discuss various strategies for parallel implementation in distributed computational environments.

The standard approach to frequency slice migration algorithms (phaseshift, split-step, ((f,x) finite difference, phase-screen) is to separately migrate each frequency independently, using an increment df defined by at least twice the total input time series length. If the trace length is T, then wrap-around is avoided by simply computing the FFT over the length 2T. This results in a frequency increment of $$df = \frac{1}{2T}$$

and means that the number of frequencies that must be migrated is $$n_{freq} = \frac{f_1 - f_0}{df} + 1 \qquad (1)$$

For the average data set, $n_{freq}$ is typically one-half to one-third of the number of time samples in each trace, and ranges from a few hundred to around one-thousand.

Recently, Sirgue, Pratt, Plessix and Mulder (Sirgue and Pratt (a), 2001; Sirgue and Pratt (b), 2001; Plessix et. al., 2001) propose that full waveform inversion can be accomplished using an extremely limited discrete set of frequencies. In one-dimension, they show that the alternative set of frequencies can be defined by letting $z_{max}$ be the maximum depth of the migration, $h_{max}$ the maximum offset in the data, and $$\alpha = \frac{1}{\sqrt{\left(\frac{h_{max}}{2z_{max}}\right)^2 + 1}}. \qquad (2)$$

Then, in a homogeneous medium with velocity, v, the migration of each frequency results in an image with a spatial bandwidth of $$\Delta k = k_{max} - k_{min} = \frac{2f}{v} - \frac{2\alpha f}{v}. \qquad (3)$$

Note that slower velocity media produce wider spatial bandwidths per frequency than faster ones, but the lower end of the spatial bandwidth is controlled by α.

It is natural to ask if this idea might be effective in the simpler case of downward continuation based wave-equation migration. More importantly, it is of interest to determine the extent to which this concept applies in higher dimensions. Extension of the methodology to higher dimensions can be accomplished in several ways. An immediate and positive conclusion is based on the so called Ewald sphere of Clayton and Stolt (1981). For example, in a 3D zero-offset setting, migration or inversion of a single frequency resolves the spatial wavenumbers lying in a spherical dispersion-relation-defined shell. In the nonzero offset case the shell becomes a volume, and the associated dispersion-relation-controlled figure might be described as an Ewald doughnut. The definition of α is slightly different but the fact that a volume of wavenumbers is imaged by a single frequency is clearly valid.

A more detailed explanation can be based on the wavenumber-frequency-domain-double-square-root equation. After mathematical rationalization, one has $$k_0^2 - \|\vec{k}_h\|^2 = k_z^2 + \|\vec{k}_x\|^2 \left(1 + \frac{\|\vec{k}_h\|^2}{k_z^2}\right) = k_z^2 + \|\vec{k}_x\|^2 (1 + \tan^2 \gamma) \qquad (4)$$

where $$k_0 = \frac{\omega}{v}$$

is the temporal wavenumber, $k_z$ the vertical wavenumber, $\vec{k}_z$ the lateral spatial wavenumber vector, $\vec{k}_h$ the offset wavenumber vector, and $$\gamma = \tan^{-1}\left(\frac{k_h}{k_z}\right)$$

is the opening angle defined by a pair of rays impinging and reflecting from a subsurface reflector. Note that for any fixed angular frequency ω, this quartic defines a five dimensional volume. The resulting figure is definitely not a shell. What is even more important is the fact that for the usual seismic acquisition geometry, opening angles γ are large for shallow events but small for deeper events. As a rule of thumb, γ, can be assumed to be zero when the depth of penetration is equal to or greater than the maximum offset in the acquisition scheme.

Figure 1:
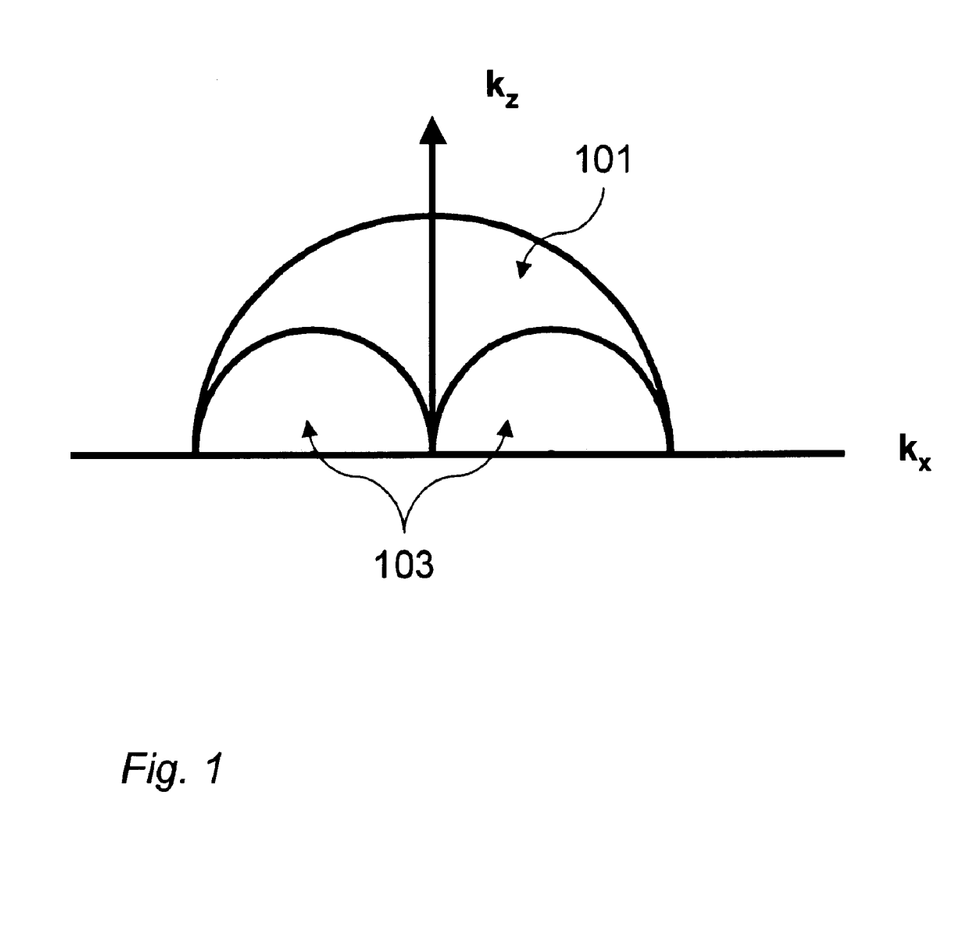
FIG. 1: Illustrates wavenumbers imaged for a given frequency.

To get an idea of the shape of the wave-number solid, it is convenient to consider the projection-slice theorem, $$P(\vec{k}_s, \vec{k}_r, \omega) = k_0^2 O(\vec{k}_h), \quad (5)$$

where P is the downward continued wavefield, $\vec{k}_s$ and $\vec{k}_r$ are the source and receiver wavenumbers, and O is the final output image. In two dimensions, FIG. 1 provides a rough idea of the range of wavenumbers that are imaged by a given fixed frequency. The area of the large semicircle 101 indicates imaged wavenumbers. The smaller semicircles 103 represent unimaged wavenumbers. As the frequency increases, the areal extent of the wavenumber images increase geometrically. The bad news is that higher frequencies are not weighted in the correct manner. This issue must be addressed in order to maintain the overall quality of the final image. The actual number of frequencies required to produce a high quality image decreases as a function of penetration depth. Another way to say this is that any limited frequency strategy should use more frequencies shallow than are used deep.

For a given bandwidth $(f_0, f_1)$ choose $$N = \frac{\log f_0 - \log f_1}{\log \alpha(z)} \quad (6)$$

where $$\alpha(z) = \frac{1}{\sqrt{1 + \left(\frac{k_h}{k_z}\right)^2}} = \frac{1}{\sqrt{1 + \tan^2 \gamma(z)}}$$

is chosen to vary with z. The number of frequencies to be migrated will then vary vertically and begin with the full bandwidth and end with a small percentage of the original set.

Start by migrating only the frequencies $$f_n = \alpha(z)^{-n} f_0 \quad (7)$$

from n=0 to n=N. As the downward continuation proceeds, decrease N, through α(z) so as to reduce the number of frequencies required for the migration. As the minimal frequency subset changes it may be necessary to use interpolation to continue the process in an accurate manner, but the result is a very computationally efficient algorithm. At each depth level, individual frequencies can be weighted to assure that a full and balanced bandwidth is imaged. The result is a set of minimal frequency data subsets that may subsequently be composited together after each frequency in the minimal subset has been image processed.

One of the programming problems in a parallel environment is that N as defined above may not equal the actual number of processors required to perform the task. Since the number of frequencies is determined by the ratio $$R = \frac{k_h}{k_z} \quad (8)$$

one need only adjust R so that N fits the initial number of processors exactly. After computing the number $$N_{fpe} = \frac{N}{N_p}$$

of frequencies per processor, taking care to assure that $N_{fpe}$ is the smallest integer greater than $$\frac{N}{N_p},$$

compute $$R = \sqrt{10^{\frac{\log f_1 - \log f_0}{N_p * N_{fpe}}} - 1}. \quad (9)$$

The new number, N, of frequencies is then assured to be $N=N_p*N_{fpe}$. This done, the number of frequencies per processor will be at least one and the number to process will divide evenly by the number of processors. As the process continues, the actual number of frequencies will decrease, and as a result, so will the required number of nodes.

To see how this process reduces the number of frequencies in a given migration, assume that the maximum offset is 6 km and the maximum migration depth is 10 km. If the target frequency range is $f_0=5$ and $f_1=45$ then, assuming a maximum angle of 16.7 degrees $$\alpha^{-1} = \sqrt{\left(\frac{3}{10}\right)^2 + 1} \approx 1.044$$

the migration-frequency sequence looks something like 5, 5.22, 5.45, 5.69, 5.94, 6.2, 6.47, ...

and $$N = \frac{\log 9}{\log 1.044} \approx 51. \quad (11)$$

In contrast, with 8 seconds of data, the usual df would be $$\frac{1}{16} = 0.0625$$

and $$N_{freq} = \frac{40}{0.0625} + 1 = 641 \quad (12)$$

The performance improvement is thus $\approx 12.5$.

An even more dramatic result is possible by reducing the maximum migration depth from 10 km to 6 km. In this case, $$\alpha^{-1} = \sqrt{1.25} \approx 1.12 \quad (13)$$

the migration-frequency set is 5, 5.6, 6.27, 7.025, 7.87, ...

and $$N = \frac{\log 9}{\log 1.12} \approx 19. \quad (14)$$

Now the performance gain is an astounding $$\frac{641}{19} = 33.7!$$

Figure 2:
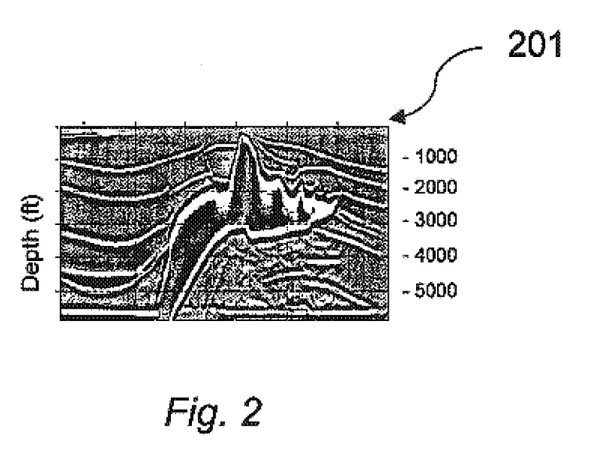
FIG. 2: Illustrates a full-bandwidth shot-domain migration.
Figure 3:
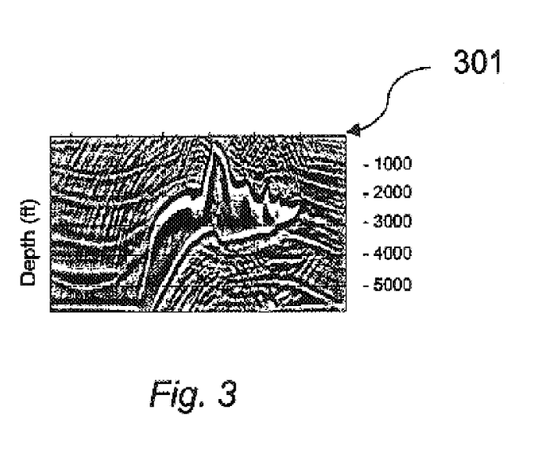
FIG. 3: Illustrates two-dimensional shot-domain migration.
Figure 4:
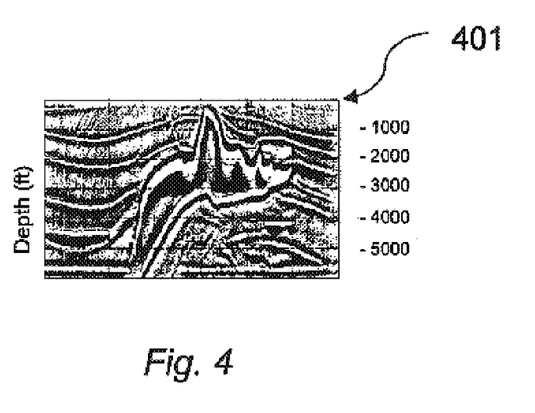
FIG. 4: Illustrates two-dimensional shot-domain migration.
Figure 5:
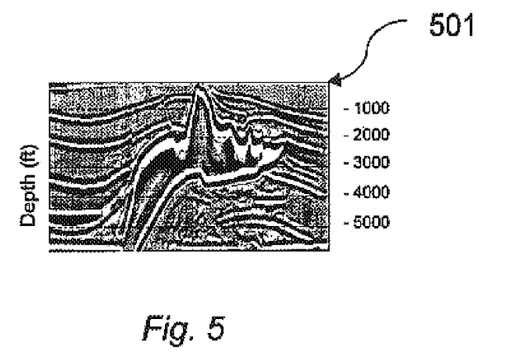
FIG. 5: Illustrates two-dimensional shot-domain migration.

FIGS. 2, 3, 4, and 5 provide a series of images that demonstrate the limited frequency approach. They show that in some cases, one can achieve useable images with an extremely sparse data set. The first, FIG. 2, is a fullband migration panel 201 of the SEG AA' data set using the full frequency band of 384 frequencies. The second panel labeled 301 in FIG. 3 was produce with R=0.58 and only 21 frequencies. The third panel 401, in FIG. 4, is the result with R=0.292 for 73 frequencies. The fourth panel 501, FIG. 5, is the result with R=0.2 for 153 frequencies. Of these, only FIG. 3 displays a questionable result. Depending on the processing needs, it might be acceptable as a starting point, but certainly not a final image. FIG. 4 represents a good compromise between speed and accuracy. Note that it was produce in 19% of the time it took for the fullband image in FIG. 2. The final figure, FIG. 5, is virtually identical to the broadband result in FIG. 2. While it was produce in slightly less than half the time used for the full-band image it is not clear that the extra effort is worth the computational cost.

The preceding figures demonstrate the validity of the frequency selection process and also show that, depending on the processing need, acceptable results can be achieved very efficiently. Limited-frequency methods (with minimal frequency subsets) provide for accurate imaging of large seismic data sets. If there is need to increase the density of frequencies defined by Equation (7), one simply starts with a new $f_0$, or ratio R, then remigrate with a new independent frequency set and composites or adds the results together. Note that the frequency density is completely controlled through the ratio of the offset wavenumber $k_h$ to the vertical wave number $k_z$. As the incident angle approaches zero, fewer and fewer frequencies are required to image the same number of vertical and horizontal wavenumber. The fact that the number of frequencies in this implementation is on the order of at most 100, means that data distribution and resource allocation issues are minimized. The speed of the limited frequency approach means that routine application of full wave-equation methods is now a realistic, economical approach to high quality seismic imaging.

Figure 6:
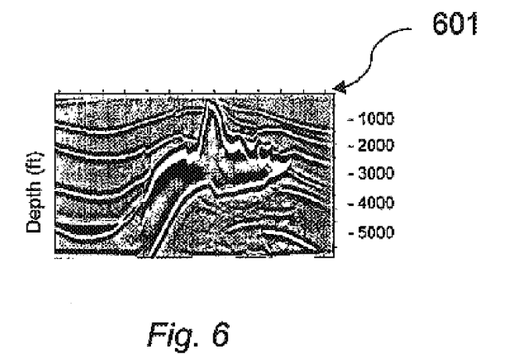
FIG. 6: illustrates variable downward continuation with intermediate spline interpolation.

FIG. 6 illustrates the result of coupling intermediate frequency spline interpolation on a limited frequency downward continuation with R=0.292. In this case, shot-domain migration 601 of the two-dimensional SEG AA' data set, the full frequency band was computed from the limited frequency set by spline interpolation. The computational load in this case is roughly the same as that for FIG. 4, but the results are at least as good.

Figure 7:
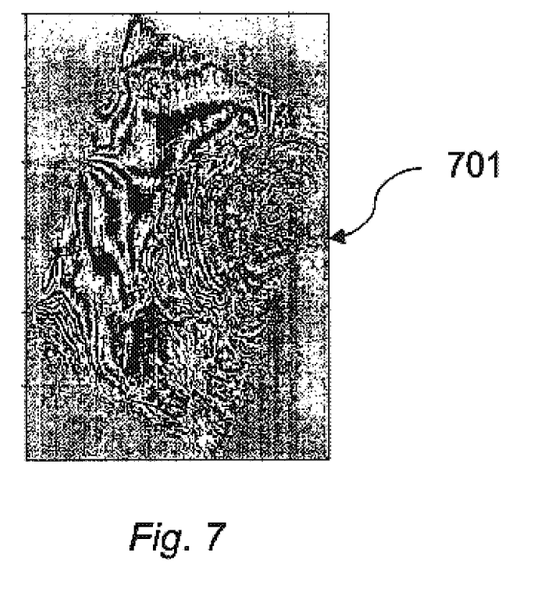
FIG. 7: illustrates a depth slice from a common-azimuth-limited-frequency migration of a large 3D Gulf of Mexico data set.

FIG. 7 shows that the limited frequency approach works quite well on a depth slice 701 of real 3D data. This depth slice from a common-azimuth-prestack migration of a large Gulf of Mexico data set was obtained using an average of 100 frequency slices. The resulting runtime was approximately ⅑ that of a more traditional approach.

Figure 8:
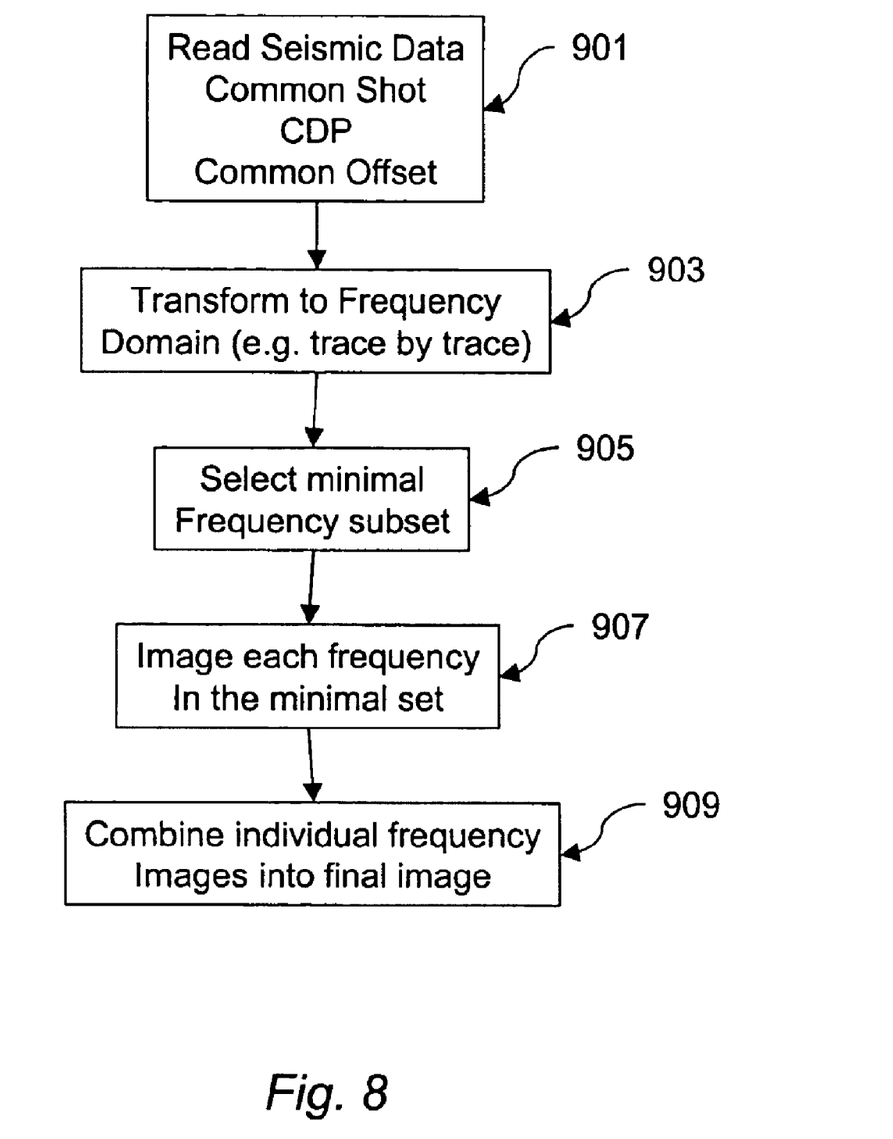
FIG. 8: illustrates a flow chart of an embodiment of the present invention.

The flow chart of FIG. 8 illustrates a preferred embodiment of the method and system provided by the present invention. Seismic data are acquired 901 and transformed a frequency domain 903. The data may be gathered in any manner, for example common shot, common midpoint, common depth point, common image point, common offset, etc. A plurality of minimal frequency subsets are formed 905 comprising selected frequencies. The frequencies may be selected according to Equation 6 above so that more frequencies are selected for shallower image positions. The selected frequencies are imaged 907 to form frequency images. The selected frequencies may be individually weighted before or after imaging to assure a full and balanced bandwidth. The frequency images are composited 909 to form an intermediate or final composited migration image.

Figure 9:
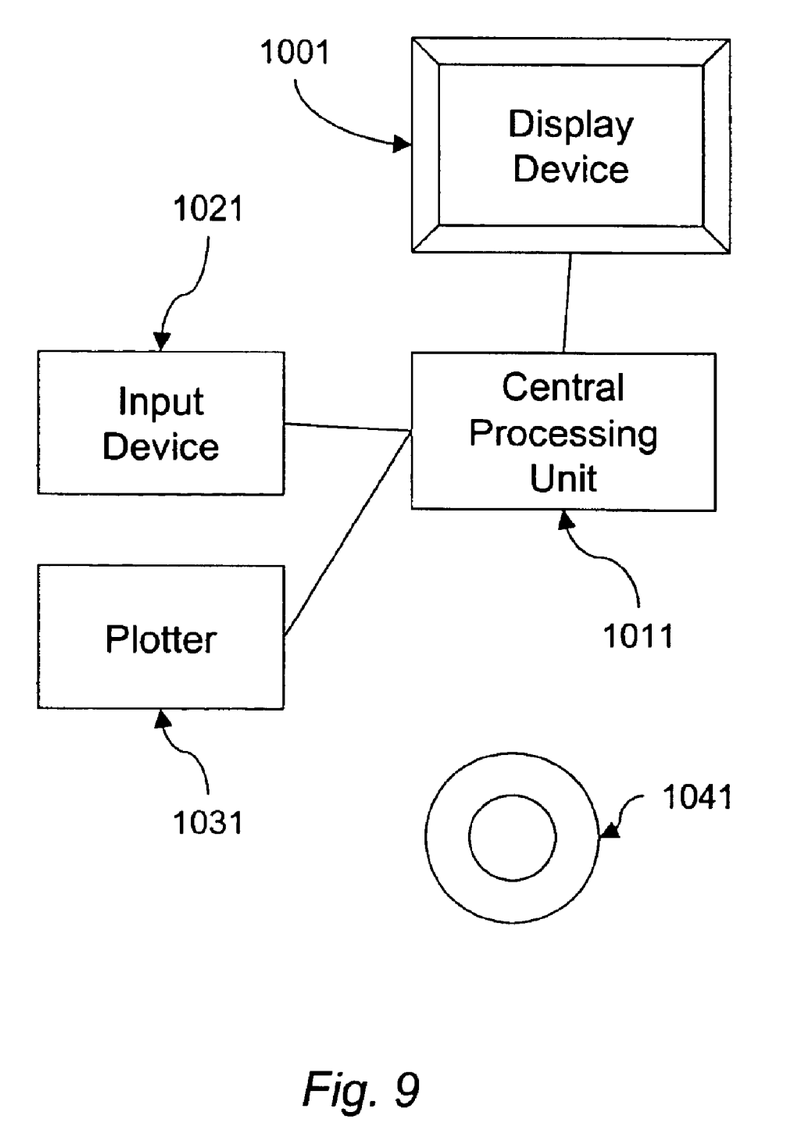
FIG. 9: illustrates a computer system for carrying out an embodiment of the invention.

The method and system of the present invention disclosed herein may be conveniently carried out by writing a computer program to carry out the steps described herein on a work station or other conventional digital computer system of a type normally used in the industry. The generation of such a program may be performed by those of ordinary skill in the art based on the processes described herein. FIG. 9 illustrates a computer system comprising a central processing unit 1011, a display 1001, an input device 1021, and a plotter 1031. The computer program for carrying out the invention will normally reside on a storage media (not shown) associated with the central processing unit. The computer program may be transported on a CD-ROM or other storage media shown symbolically as storage medium 1041.

The method and system of the present invention provides results that may be displayed or plotted with commercially available visualization software and computer peripherals. Such software and computer peripherals are well known to those of ordinary skill in the art. It should be appreciated that the results of the methods of the invention can be displayed, plotted and/or stored in various formats.

While the invention has been described and illustrated herein by reference to embodiments in relation to the drawings attached hereto, various changes and further modifications, apart from those shown or suggested herein, may be made herein by those skilled in the art, without departing from the spirit of the invention, the scope of which is expressed in the following claims.

What is claimed is:

1. A method for processing seismic data comprising:

a) acquiring seismic data;

b) transforming said seismic data to a frequency domain;

c) forming a plurality of minimal frequency subsets comprising selected frequencies;

d) imaging said selected frequencies to form frequency images; and e) compositing said frequency images to form a composited migration image.

2. The method of claim 1 wherein forming said plurality of minimal frequency subsets further comprises selecting frequencies for the minimal frequency subsets according to $f_n = \alpha(z)^{-n} f_0$ for n=0 to n=N where $$N = \frac{\log f_0 - \log f_1}{\log \alpha(z)}.$$

3. The method of claim 1 further comprising reducing the number of frequencies as depth increases.

4. The method of claim 1 further comprising reducing the number of frequencies as depth increases according to $$\alpha(z) = \frac{1}{\sqrt{1 + \left(\frac{k_h}{k_z}\right)^2}} = \frac{1}{\sqrt{1 + \tan^2 \gamma(z)}}.$$

5. The method of claim 1 further comprising weighting at least one of i) a plurality of said selected frequencies at a depth level and ii) a plurality of said imaged frequencies at a depth level.

6. A digital computer programmed to utilize seismic data traces obtained over a region of the earth's subsurface to perform a process comprising:
(a) forming a gather of seismic data traces;
(b) transforming said seismic data to a frequency domain;
(c) forming a plurality of minimal frequency subsets comprising selected frequencies;
(d) imaging said selected frequencies to form frequency images; and
(e) compositing said frequency images to form a composited migration image.

7. The digital computer of claim 6 further programmed to perform a process for forming said plurality of minimal frequency subsets by selecting frequencies for the minimal frequency subsets according to $f_n = \alpha(z)^{-n} f_0$ for n=0 to n=N where $$N = \frac{\log f_0 - \log f_1}{\log \alpha(z)}.$$

8. The digital computer of claim 6 further programmed to perform a process for reducing the number of frequencies as depth increases.

9. The digital computer of claim 6 further programmed to perform a process for reducing the number of frequencies as depth increases according to $$\alpha(z) = \frac{1}{\sqrt{1 + \left(\frac{k_h}{k_z}\right)^2}} = \frac{1}{\sqrt{1 + \tan^2 \gamma(z)}}.$$

10. The digital computer of claim 6 further programmed to perform a process for weighting at least one of i) a plurality of said selected frequencies at a depth level and ii) a plurality of said imaged frequencies at a depth level.

11. A method for processing seismic data comprising:
a) acquiring seismic data;
b) transforming said seismic data to a frequency domain;
c) forming a plurality of minimal frequency subsets comprising selected frequencies; said selected frequencies in the range ($f_0$, $f_1$) for the minimal frequency subsets selected according to $f_n = \alpha(z)^{-n} f_0$ for n=0 ti n=N where $$N = \frac{\log f_0 - \log f_1}{\log \alpha(z)}.$$

d) imaging said selected frequencies to form frequency images; and
e) compositing said frequency images to form a composited migration image.

12. The system of claim 11 further comprising reducing the number of frequencies as depth increases.

13. The system of claim 11 further comprising reducing the number of frequencies as depth increases according to $$\alpha(z) = \frac{1}{\sqrt{1 + \left(\frac{k_h}{k_z}\right)^2}} = \frac{1}{\sqrt{1 + \tan^2 \gamma(z)}}.$$

14. A digital computer programmed to utilize seismic data traces obtained over a region of the earth's subsurface to perform a process comprising:
a) forming a gather of seismic data traces;
b) transforming said seismic data to a frequency domain;
c) forming a plurality of minimal frequency subsets comprising selected frequencies, said selected frequencies in the range ($f_0$, $f_1$) for the minimal frequency subsets selected according to $f_n = \alpha(z)^{-n} f_0$ for n=0 to n=N where $$N = \frac{\log f_0 - \log f_1}{\log \alpha(z)};$$

d) imaging said selected frequencies to form frequency images; and
e) compositing said frequency images to form a composited migration image.

15. The digital computer of claim 14 further programmed to perform a process for reducing die number of frequencies as depth increases.

16. The digital computer of claim 14 further programmed to perform a process for reducing the number of frequencies as depth increases according to $$\alpha(z) = \frac{1}{\sqrt{1 + \left(\frac{k_h}{k_z}\right)^2}} = \frac{1}{\sqrt{1 + \tan^2 \gamma(z)}}.$$

* * * * *